March 27, 1934.  J. EMMI, JR  1,952,242
AIRPLANE
Filed Sept. 7, 1933  3 Sheets-Sheet 1
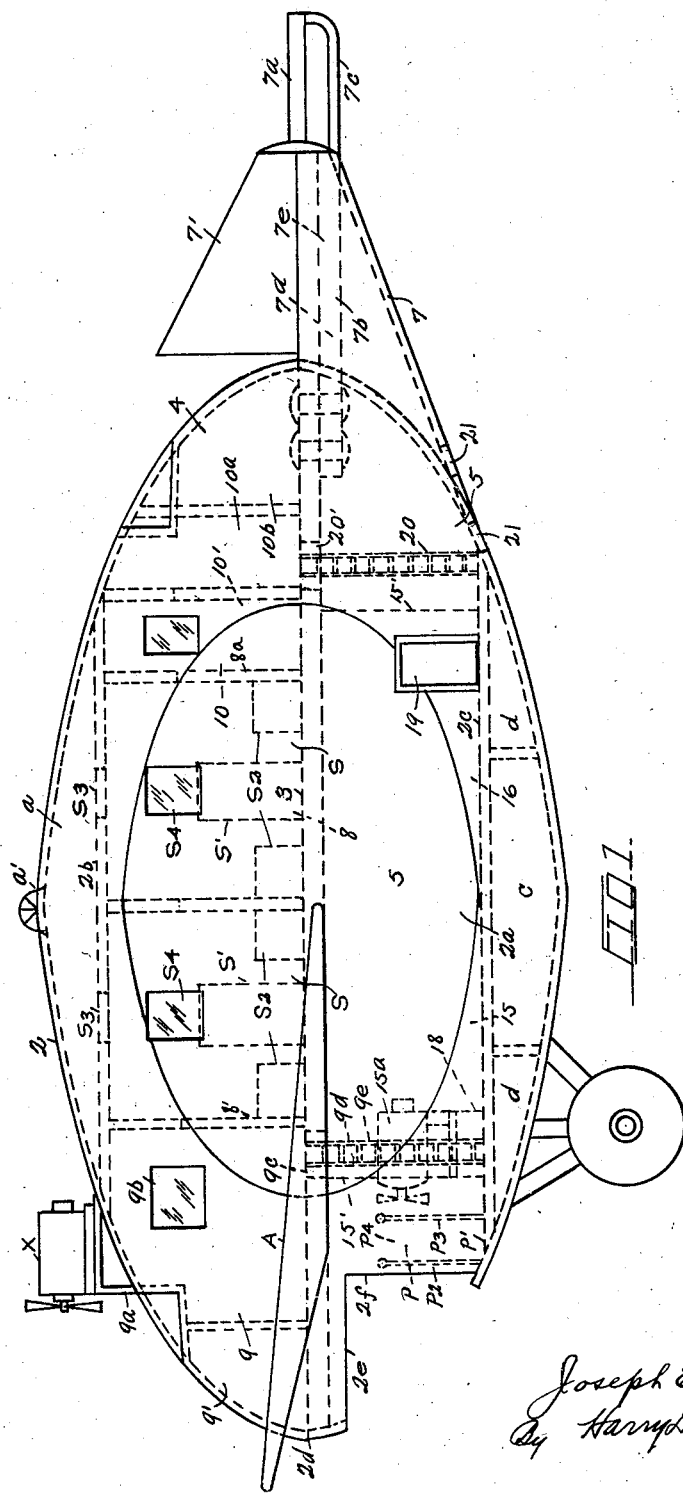
Inventor.
Joseph Emmi Jr.
By Harry D. Wallace
Attorney March 27, 1934. J. EMMI, JR 1,952,242
AIRPLANE
Filed Sept. 7, 1933 3 Sheets-Sheet 2
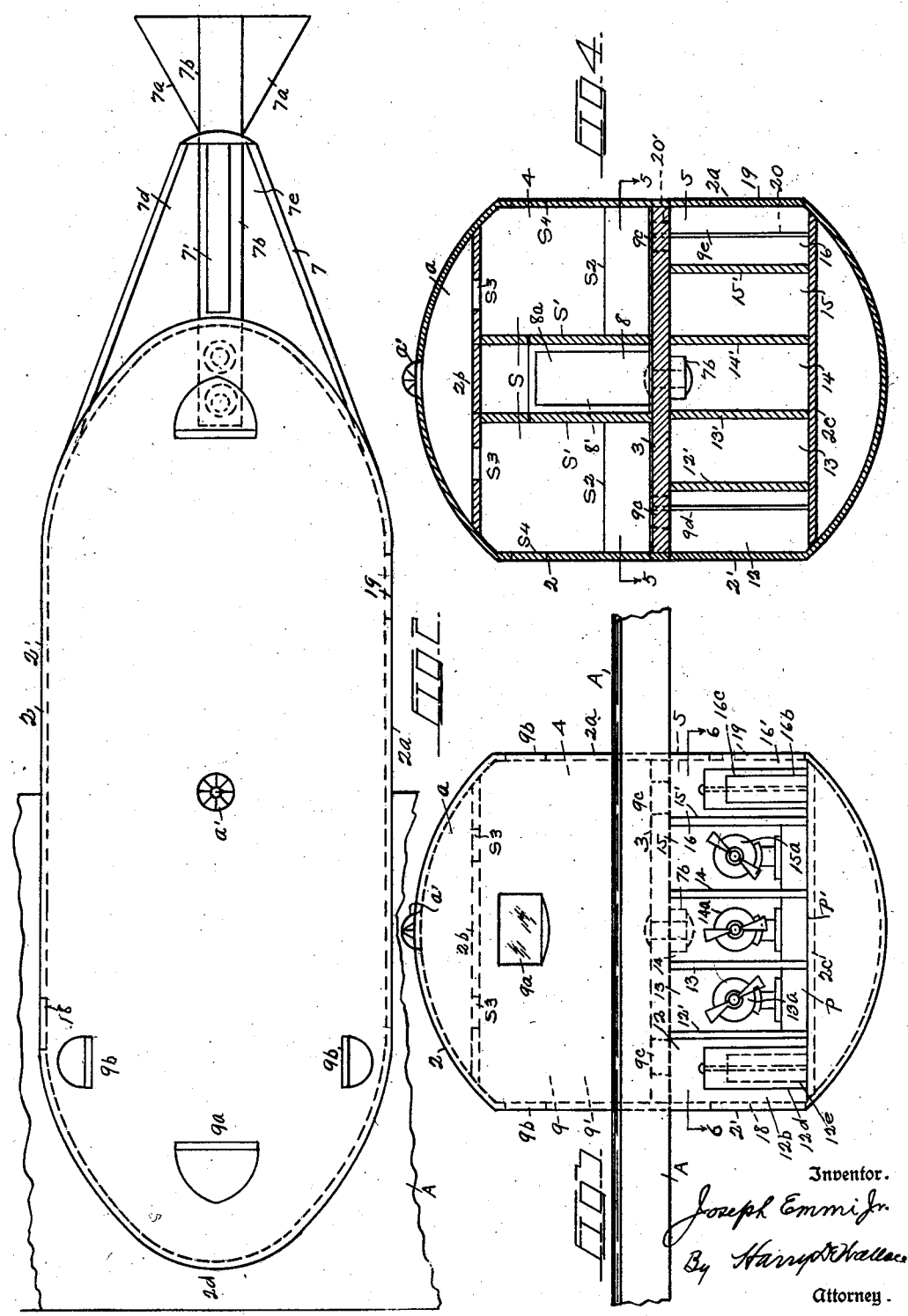

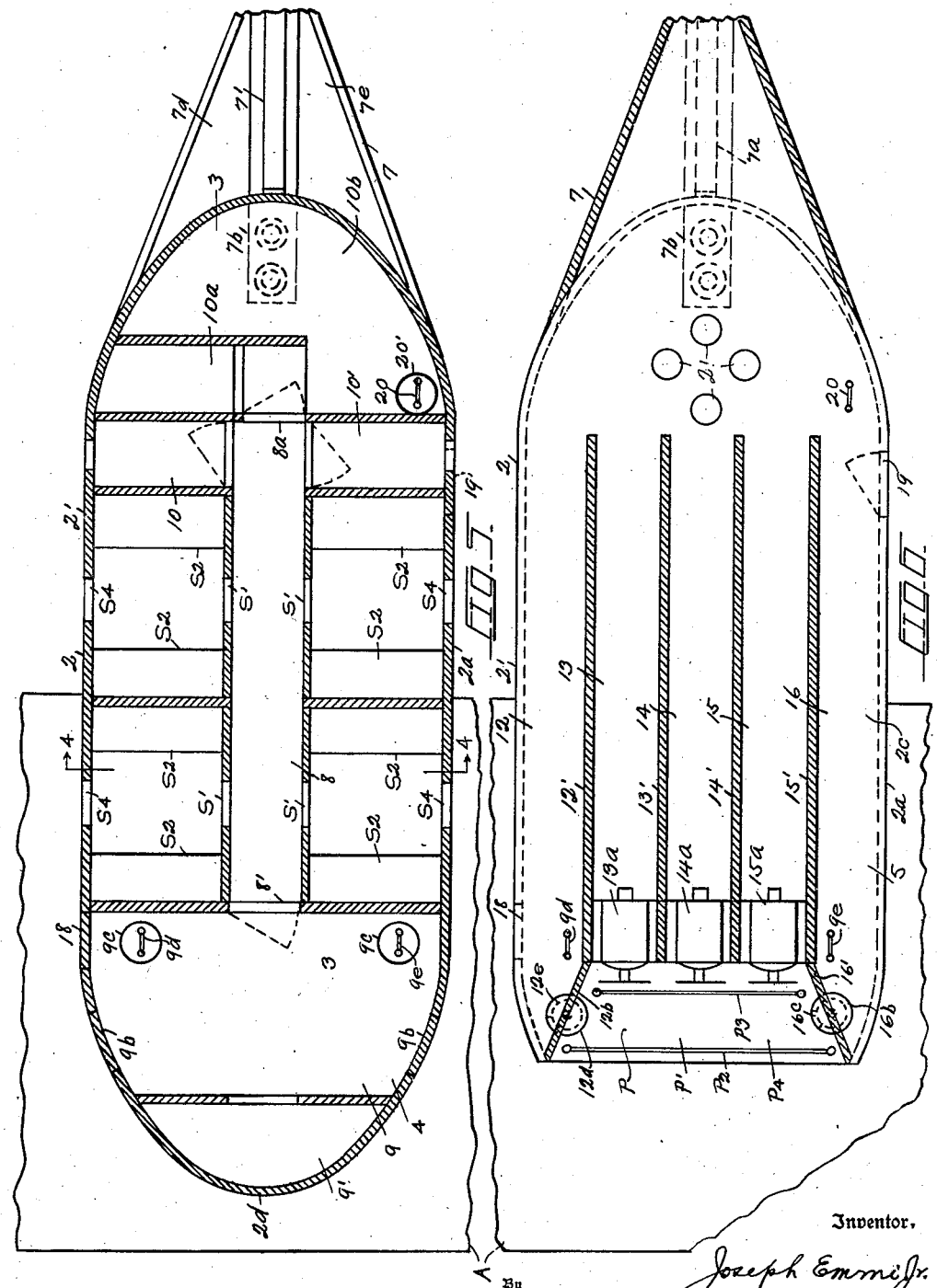

Patented Mar. 27, 1934

1,952,242

UNITED STATES PATENT OFFICE 1,952,242

AIRPLANE

Joseph Emmi, Jr., Syracuse, N. Y.

Application September 7, 1933, Serial No. 688,534

6 Claims. (Cl. 244—18)

This invention relates to improvements in airplanes, and has particular reference to cabin, or passenger carrying aircraft.

The object of the invention is to provide an all-metal airplane of novel and simple construction designed especially for over-land navigation, having an oval-shaped body or fuselage and being divided substantially on the line of its longitudinal axis by means of a stout floor to provide upper and lower decks or compartments, the uppermost of which is sub-divided into separate passenger staterooms that are preferably disposed amidship and arranged at the opposite sides of and communicate with a central longitudinal hallway. The forward end of the upper half of the fuselage comprises the operating rooms for the use of the pilot and his assistants, in which may be located the usual navigating and controlling instruments, one of said rooms communicating with the main hall, as well as with the lower deck. The upper half may also be provided with private quarters for other members of the crew, and with facilities for the storage of baggage, mail, express and various supplies.

The lower half of the fuselage is divided longitudinally into a number of similar channels or tunnels by means of parallel vertical walls, certain of said tunnels being arranged centrally and being equipped with motors which are preferably located within the forward ends of said tunnels and face a transverse horizontal opening in the nose of the fuselage, through which the air is drawn by the propellers of the motors and thence driven through the individual passages towards the rear end of the fuselage, where the air finally escapes through openings in the hollow tapering tail. By this arrangement, the air displaced by the motors is afforded a free and substantially straight longitudinal course that offers extremely low resistance, and hence tends to make the flights more speedy. This novel disposition of the motors within the tunnelled interior of the lowermost compartment also tends to greatly minimize the noise of the craft when in motion. In the present construction, the disposing of the motors within the lower half of the fuselage makes them less liable to be affected by weather conditions, and besides, the motors may be attended during flights without exposing the pilots and mechanicians to the discomforts of summer and winter storms, and the danger of accidents is likewise greatly lessened. Below the floor-level of the lower main compartment, ample space is provided for the storage of gasoline, oils, and the like, the tanks for the same being built-in and safely removed from the hot exhaust of the motors, thereby obviating all danger of the inflammable fuels and lubricants becoming accidentally ignited. Furthermore, by this novel construction and arrangement, these combustible materials are less liable to be spilled and become ignited in case the plane crashes, thereby safeguarding the human occupants, as well as the cargo, from cremation.

I attain these objects by the means set forth in the detailed description which follows, and as illustrated by the accompanying drawings, in which—

Figure 1 is a side elevation of the complete airplane, as in flight. Fig. 2 is a top plan view of the same. Fig. 3 is a front elevation showing the low-swung tri-motor drive for the plane. Fig. 4 is a vertical cross-section, taken on line 4—4 of Fig. 5. Fig. 5 is a horizontal section taken on line 5—5 of Fig. 4. And Fig. 6 is a similar section taken on line 6—6 of Fig. 3.

In the drawings, 2 represents the fuselage or body of the plane, which is preferably constructed of light metal such as sheet aluminum, having an oval shape in side elevation, as shown in Fig. 2, and preferably being divided substantially in the line of its longitudinal axis by a horizontal floor 3 whose area is co-extensive with the span of its walls, into upper and lower compartments 4 and 5 respectively, the said floor preferably being relatively stout and capable of safely supporting considerable dead-weight. The opposite sides of the fuselage or coach 2 are preferably formed with parallel plane portions, as 2'—2a, to reduce its bulk laterally and lessen resistance when the plane is being propelled through the air. This flattening of the sides also tends to facilitate dirigibility of the craft. The upper and lower halves of the fuselage are similarly formed with horizontal sheet-metal walls, as 2b—2c, that parallel the floor 3 to provide attic-like ventilating and storage space $a$ at the top, and fuel and lubricating oil tanks $c$ and $d$ at the bottom, as shown in Figs. 1, 3 and 4. $a'$ represents any suitable adjustable ventilator that may be inserted in an opening in the top of the fuselage and communicates with ventilating space $a$, as shown in Figs. 1, 3 and 4. Adjacent its nose 2d, the fuselage is provided with a single wing A of slightly angular cross-section, which extends laterally away in the plane of the floor 3, its forward and rearward edges preferably being feathered and the former edge being unbroken and projecting a short distance beyond the tip of the nose, as shown in Figs. 1 and 3. The rear end of the fuselage 2 is formed with a hollow open-top tapered tail portion 7, that communicates with the lower compartment 5 and is equipped with the usual vertical and horizontal tail planes, as 7'—7a, the said planes being directly supported by a stout beam or part 7b that extends rearwardly substantially in the plane of the floor 3, to which it may be rigidly secured, as shown. In practice, the free end of the beam 7b is shod with a metal part, as 7c, to withstand the frictional wear and the battering incident to taxiing the craft for the starting and ending of the flights.

The upper half of the fuselage 2 may be subdivided, as shown in Figs. 1, 4 and 5, into separate passenger compartments or staterooms S that are preferably disposed amidship and arranged at the opposite sides of and communicating by doors S' with a central longitudinal passageway 8. The forward end of the upper half of the fuselage comprises the operating rooms 9—9' for use by the pilots and the assistants, and in which may be located the usual navigating, controlling and other instruments (not shown); the latter rooms being provided with front and side windows 9a—9b, and with floor openings 9c for descent to the lower deck 5 by any suitable means, as by ladders 9d—9e. The room 9 communicates with the hall 8 by a door 8'. The several staterooms S may be fitted with elongated seats S2 which may serve as sleeping bunks on long voyages, and also having ventilating openings S3 in the ceiling 2b, and windows S4. At the rear of the staterooms S may be provided a lavatory 10, quarters 10' for the stewardess, and a normally open transverse hall 10a that communicates with the main hall 8 by means of a door 8a, and beyond the hall 10a may be provided one or more compartments, as 10b, suitable for the storage of baggage, mail, express and various supplies.

The lower half of the fuselage lying between the floor 3 and the bottom 2c is formed with a number of similar horizontal tunnels or passages 12, 13, 14, 15 and 16, which are defined by the side walls 2'—2a and by regularly spaced intervening parallel partitions 12', 13', 14' and 15', as shown in Figs. 4 and 6. Three of said tunnels, as 13, 14 and 15, are arranged centrally and are spaced by the last-named partitions, and within the forward ends of the latter tunnels are disposed motors, as 13a—14a—15a, that effect the driving of the airplane. The motors are preferably so disposed that their propellers project beyond the adjacent partitions, as shown in Figs. 1 and 6. The forward end of the fuselage below the floor 3 is preferably cut away horizontally and vertically, as indicated at 2e—2f, to provide a clear angular opening that admits the air to an oblong transverse pocket or maw P defined by the floors 3—2c and the sides 2'—2a, as shown in Figs. 1, 3 and 6. By this arrangement, the bottom 2c extends forwardly beyond the motors to provide a platform P' which enables the pilot and assistant to inspect, repair or replace the propellers whether or not the plane is in motion. In order to safeguard the operators of the plane when the latter is in flight, however, the platform P' is fitted with spaced transverse woven wire guards or fences, as P2—P3, which provide a free and safe passage P4 across the platform to avoid danger of the operators losing their footing and dropping into space, or being struck by the propellers. The forward ends of the outer passages 12—16 are preferably closed by angular walls 12b—16' (see Fig. 6), and in order that the operators may reach the platform P', the said walls are preferably formed with door openings in which are disposed revolving cages 12d—16b, the latter being formed with openings 12e—16c by which the operators may enter from either of the passages or runways 12—16, then rotate the cage sufficiently to enable them to step out upon the platform, as may be understood by consulting Figs. 4 and 6. These safeguarding measures involving the cages prevent the strong rush of air towards the motor tunnels, when the plane is in motion, from entering the passages 12—16 and frustrating the attempt of the operators to reach the platform P', as would be the case were ordinary doors employed. The motors and propellers are exposed directly to this inward rush of the air, the propellers boring into the air and forcing the same rearwardly through the tunnels 13, 14 and 15, thence through the tail portion 7 and finally discharging the displaced air through openings 7d—7e, which lie at the opposite sides of the beam 7b and the vertical tail plane 7', as shown in Figs. 2 and 6.

In practice, the pilot and his assistants preferably enter the fuselage through a door 18 which may be disposed in the righthand wall 2' directly opposite the battery of motors, as shown in Figs. 2, 3 and 6. This admits the members of the crew to the runway 12 within easy reach of the ladder 9d, by means of which they may ascend via a ladder 9d to the room 9 by passing through the corresponding floor 9c. The crew may descend from the room 9 via another floor opening 9c to the runway 16 by means of a similar ladder 9e, and from either of said runways they may emerge upon the platform P' by using the adjacent revolving cages 12d—16b.

The passengers preferably enter the fuselage through a door 19 which is disposed in the lefthand vertical wall 2a, the said door opening into the rear end of the passage 16, as shown in Figs. 1 and 6. Upon entering the latter passage, the passengers may immediately ascend to the floor 3 by means of a ladder 20 that registers with a floor opening 20' located in the storage compartment 10b, as shown in Fig. 5. Upon reaching the floor 3, one only needs to take a few steps across the compartment 10b to reach the normally open hall 10a, pass through door 8a into central hall 8, and thence via doors S' into the desired staterooms. Obviously, the crew and passengers may enter and leave the fuselage by either of the doors 18 or 19 if they so desire.

It will be understood from the foregoing that the occupants of the airplane may readily and quickly ascend or descend from one main compartment to the other by means of the several ladders, and they may also have free access to the various compartments and passages hereinbefore referred to without exposing themselves to the vagaries of the weather or the risk of accidentally falling from the plane.

In case either of the motors become disabled and require inspection or other attention during the flight of the plane, such motor may be shut down from the operating room, and the mechanic may then descend to the runway 12, thence to the rear end of the tunnel containing the silent motor and perform his work without interference by the strong rush of air he would have to contend with if the disabled motor were operating at its usual speed.

Owing to the fact that the vents 7d—7e through which the air displaced by the motors escapes are normally open, the tail portion 7 will naturally collect more or less water when the plane is passing through a rain storm, and as this rainwater will gravitate towards the floor 2c of compartment 5 and flood the motor tunnels 13—14—15, the tail portion 7 is preferably perforated, as shown at 21 in Figs. 1 and 6, in order to effectually drain the said compartment.

One or more auxiliary motors may be installed externally directly over the operating rooms 9—9', as shown at x in Fig. 1. When such extra motors are provided, both sets may be operated at the start of a flight, especially when the plane is heavily loaded with fuel or cargo. These motors may also be employed for generating electric current for lighting, searchlights and other conveniences, and the latter motors may also be substituted for one or more of the motors of deck 5 in case the latter become disabled.

Having thus described my invention, what I claim, is—

1. An airplane comprising a fuselage divided longitudinally to provide upper and lower compartments, laterally extending wings disposed adjacent the head of the fuselage, the upper compartment being formed with a longitudinal hallway and with staterooms communicating therewith, and operating and storage rooms communicating with the forward and rearward ends of the said hallway, the lower compartment having a hollow tapering tail portion that extends beyond the upper compartment, said tail portion having a normally open top, said lower compartment being open throughout its length and being formed with longitudinal tunnels disposed between parallel runways, motors disposed in the central tunnels to propel the airplane adapted to force the displaced air through the tunnels and the tail portion, an auxiliary motor to supplement the motors of the lower compartment for lifting the heavily loaded airplane at the start of the flights, ladders rising from said runways to the floor of the upper compartment, and built-in fuel and oil tanks disposed beneath the floor and the lower compartment.

2. An airplane comprising a fuselage divided longitudinally to provide upper and lower compartments, laterally extending wings disposed adjacent the head of the fuselage, the upper compartment being formed with a longitudinal hallway and with staterooms communicating therewith, operating and storage rooms disposed respectively beyond the forward and rearward ends of the said hallway and communicating therewith, the lower compartment having a hollow tapering tail portion that extends beyond the upper compartment, said tail portion having a normally open top, said lower compartment being open throughout its length and being formed with longitudinal tunnels and with runways at the opposite sides of the tunnels, motors disposed in the central tunnels to propel the airplane, the air displaced by the motors being forced rearwardly through the tunnels and the tail portion, ladders rising from said runways to the floor of the upper compartment, and built-in fuel and oil tanks disposed beneath the floor and the lower compartment.

3. An airship comprising a fuselage oval-shaped in side elevation having plane vertical sides and being fitted adjacent the bow of the ship with laterally extending wings, said fuselage being divided substantially in the plane of its longitudinal axis by a main floor into upper and lower decks, said uppermost deck being formed with a number of staterooms separated by a common longitudinal hallway, and with operating and storage rooms disposed forward and aft of the staterooms communicating with said hallway, the lower deck being formed with a hollow tail portion having a normally open top substantially in the plane of the main floor, said deck being open throughout its length and formed with a plurality of parallel tunnels, and a plurality of motors equipped with propellers disposed in the forward ends of certain of said tunnels adapted to force the displaced air through the corresponding tunnels towards the openings in the tail portion.

4. An airship comprising a body oval-shaped in side elevation having plane vertical sides and being divided by a floor into upper and lower decks, the upper deck being formed amidship with a number of staterooms for the accommodation of passengers separated by a common hallway, the interior of said upper deck forward and aft of the staterooms being formed respectively with operating rooms and with storage compartments, the lowermost deck being normally open throughout its length and being medially formed with a number of channels defined by parallel partitions, motors disposed in the central channels to propel the ship, the upper and lower decks being horizontally divided respectively by a ceiling and a bottom that parallel the main floor to provide ventilation and fuel and oil storage spaces, and wings extending laterally from the opposite sides adjacent the nose of the body.

5. An airship comprising a fuselage divided substantially in the plane of its longitudinal axis by a main floor into upper and lower compartments, horizontal wings extending laterally away from the fuselage substantially in the plane of the main floor, the upper compartment being sub-divided to provide staterooms for passengers, a central passage separating and communicating with said staterooms, operating rooms disposed between staterooms and the head of the fuselage, the lowermost compartment being open throughout its length and divided longitudinally into a number of contiguous tunnels, the rear end of the lower compartment comprising a hollow tapered tail portion having a normally open top disposed in the plane of the main floor, motors disposed in certain of the tunnels adapted to force the air displaced by their propellers through the tunnels and the openings of the tail portion, runways disposed at the opposite sides of the tunnels to provide access to the motors, a platform extending forwardly from the motors and communicating with the runways by revolving doors, and means of descent to and ascent from said runways.

6. In an airship a fuselage of substantially oval-shape in side elevation, a main floor to divide the fuselage into upper and lower compartments, the uppermost compartment being formed with a number of staterooms disposed amidship for passengers and with a central longitudinal passage that communicates with the staterooms, operating rooms disposed between the staterooms and the forward end of the fuselage, storage rooms disposed at the rear of the staterooms, all of said rooms communicating with the central passage, the lowermost compartment being formed with a bottom that parallels the main floor to provide built-in tanks for storing fuel and lubricants, the space between the main floor and said bottom being normally open throughout the length of the fuselage and being divided longitudinally by a number of parallel partitions into tunnels and runways, motors disposed in the forward ends of certain of said tunnels to drive the ship, the said bottom extending forwardly beyond the motors to facilitate attending the motors, means for the crew and passengers to pass from one main compartment to the other, and wings extending laterally away from the opposite sides of the fuselage said wings being disposed near the forward end of the fuselage.

JOSEPH EMMI, Jr.